United States Patent [19]
Carney et al.

[11] Patent Number: 5,339,406
[45] Date of Patent: Aug. 16, 1994

[54] RECONSTRUCTING SYMBOL DEFINITIONS OF A DYNAMICALLY CONFIGURABLE OPERATING SYSTEM DEFINED AT THE TIME OF A SYSTEM CRASH

[75] Inventors: Michael W. Carney, Merrimacport, Mass.; Timothy Marsland, Palo Alto, Calif.; William F. Pittore, Lexington, Mass.

[73] Assignee: Sun Microsystems, Inc., Mountain View, Calif.

[21] Appl. No.: 862,823

[22] Filed: Apr. 3, 1992

[51] Int. Cl.$^5$ .............................................. G06F 11/34
[52] U.S. Cl. .................................... 395/575; 371/19; 395/425; 395/475; 364/221.2
[58] Field of Search ............... 395/575, 425, 700, 250, 395/325, 800, 600, 775; 371/7, 12, 13, 16.4, 16.5, 19, 21.1, 40.1, 9.1; 364/232.3, 232.7, 221.2, 221.7, 264.3, 231, 266.5, 242.4, 247, 267.7

[56] References Cited

U.S. PATENT DOCUMENTS

| | | | |
|---|---|---|---|
| 3,778,776 | 12/1973 | Hakozaki | 340/172.5 |
| 3,787,813 | 1/1974 | Cole et al. | 340/172.5 |
| 4,636,940 | 1/1987 | Goodwin, Jr. | 364/200 |
| 4,814,971 | 3/1989 | Thatte | 371/12 |
| 4,847,749 | 7/1989 | Collins et al. | 364/200 |
| 4,926,316 | 5/1990 | Baker et al. | 364/200 |
| 5,038,319 | 8/1991 | Carter et al. | 364/944.9 |
| 5,101,494 | 3/1992 | Bilski et al. | 395/700 |

Primary Examiner—Charles E. Aktinson
Assistant Examiner—Dieu-Minh Le
Attorney, Agent, or Firm—Blakely Sokoloff Taylor & Zafman

[57] ABSTRACT

A relocatable segment list builder, a system image dump driver, and a system image dump saver are provided to a dynamically configurable operating system being executed on a computer system. The operating system includes a root executable segment and a number of pageable relocatable segments that are loaded on an as needed basis. The relocatable segment list builder maintains in memory a non-pageable relocatable segment list, which comprises names of the relocatable segments that are loaded in any particular point in time. The system image dump driver dumps an image of the operating system including the non-pageable relocatable segment list to a dump device at the time of a system crash. In addition, a system image saver is provided to the computer system. The system image saver builds a system image dump file, which comprises the relocatable segment list dumped using the operating system image dumped. The system image saver also builds a companion system image dump symbol definition file, which comprises all symbol definitions of the operating system defined at the time of the system crash regardless of whether the relocatable segments containing the symbol definitions are paged out of memory or not. The system image saver determines which relocatable segments are loaded at the time of the crash using the system image dump file built. The system image saver then reconstructs the symbol definitions using the symbol and string tables of the root executable and the relocatable segments loaded at the time, which are stored in mass storage. As a result, all system definitions contained in loaded relocatable segments of the operating system at the time of the crash, regardless of whether the containing relocatable segments are paged out of memory or not, are available to aid in debugging the system crash.

16 Claims, 7 Drawing Sheets

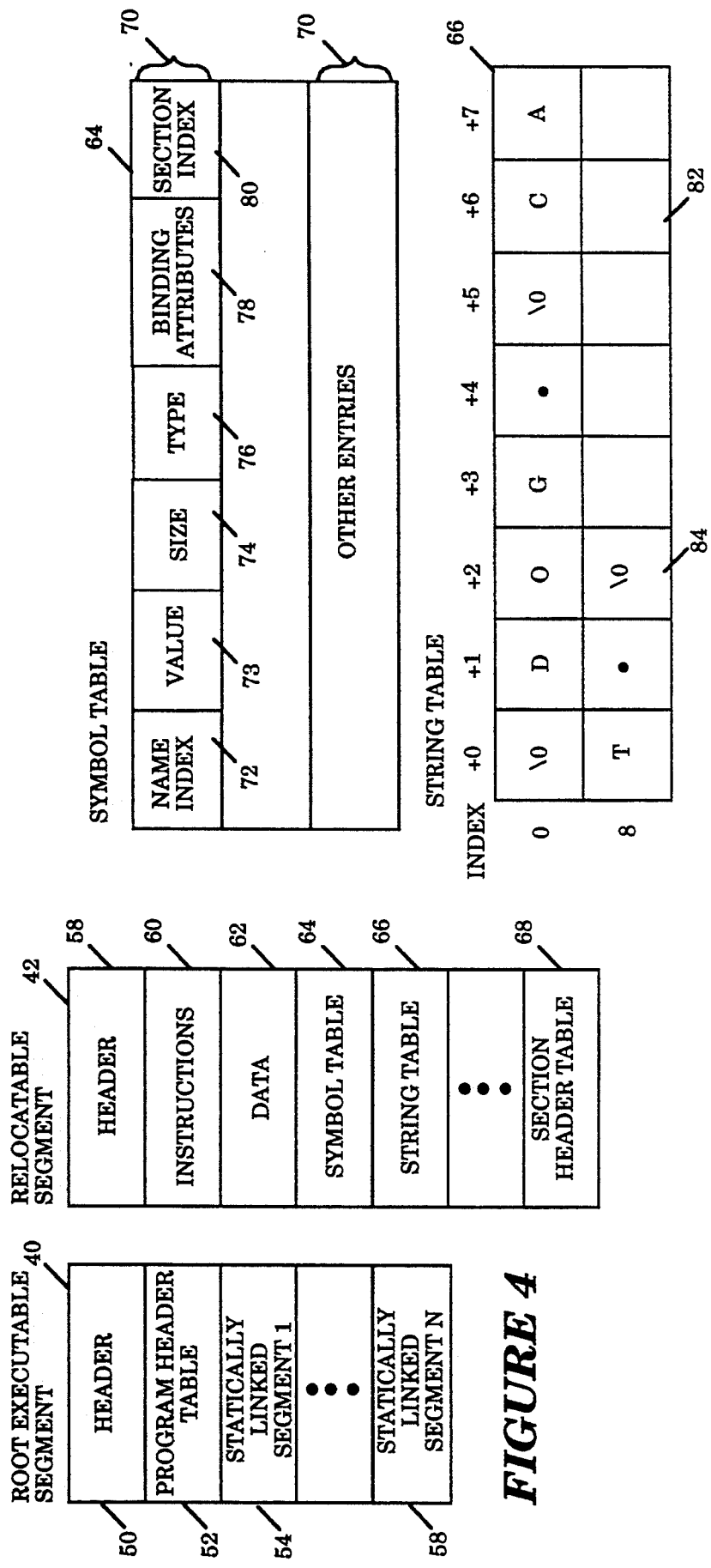

RECONSTRUCTING SYMBOL DEFINITIONS OF A DYNAMICALLY CONFIGURABLE OPERATING SYSTEM DEFINED AT THE TIME OF A SYSTEM CRASH

BACKGROUND OF THE INVENTION

1. Field of the Invention:

The present invention relates to the field of computer systems and their operating systems, in particular, computer systems executing the UNIX ® system (UNIX is a registered trademark of UNIX System Laboratories, Inc.). More specifically, the present invention relates to reconstructing the symbol definitions of a dynamically configurable operating system, in particular, the kernel of a UNIX ® system, at the time of a system crash.

2. Background:

Traditionally, many operating systems including the kernel of the UNIX ® system is pre-built as one executable image, that is all program segments of the operating system are statically linked resolving all symbolic references to the symbolic definitions. Typically, the symbol and string tables of the operating system are made unpageable. Therefore, in the event of a system crash, when the system image in memory is taken, all the symbol definitions are available for debugging.

While the pre-built single executable image operating system is often tailorable, special knowledge and skill are usually required. As a result, experience has shown that most computer systems simply use the generic version even though many functions included in the generic version are not used, thereby wasting memory resource.

Today, some operating systems including the kernel of some UNIX ® systems are configured dynamically. Under a fully dynamically reconfigurable operating system, the functions offered by the operating system are distributed over a root executable segment and a number of relocatable segments. The functions distributed in the relocatable segment are dynamically loaded and linked on an as needed basis. In the event of memory constraint, some dynamically loaded and linked relocatable segments that have not been used recently may be overlaid. Furthermore, the symbol and string tables of the root executable segment and the dynamically loaded and linked relocatable segments are typically made pageable. As a result, the symbol definitions available at any particular point in time change dynamically, and some of the current symbol definitions of the operating system may be paged out at the time the system image in memory is dumped in the event of a system crash. Those paged out symbol definitions will not be included in the system image dump taken and therefore unavailable to assist debugging. Thus, a new approach must be developed to reconstruct all symbol definitions of the operating system defined at the time of a system crash in order for them to be available for debugging.

As will be disclosed, the present invention provides a method and apparatus for reconstructing the symbol definitions of a dynamically configurable operating system, in particular, a dynamically configurable kernel of the UNIX ® system, defined at the time of a system crash.

For further description of the UNIX ® system including the kernel, see M. J. Bach, *The Design of the UNIX ® Operating System*, Prentice Hall, 1986.

SUMMARY OF THE INVENTION

A method and apparatus for reconstructing the symbol definitions of a dynamically configured operating system defined at the time of a system crash is disclosed. The method and apparatus has particular applications to dynamically configurable operating systems, including the kernel of the UNIX ® system.

Under the presently preferred embodiment of the present invention, a relocatable segment list builder and a system image dump driver are provided to a dynamically configurable operating system. The relocatable segment list builder is used to maintain a non-pageable relocatable segment list. The system image dump driver is used to dump an image of the operating system in memory at the time of a system crash.

The non-pageable relocatable segment list comprises the relocatable segment names of the operating system that are loaded and linked at any particular point in time. The operating system comprises a root executable segment which is loaded at the time of system start up, and a plurality of relocatable segments that are loaded and linked on an as needed basis. Individual portions of the root executable and relocatable segments may or may not be pageable.

The system image dumped at the time of the system crash comprises the portions of the root executable and the loaded relocatable segments that have not been paged out of memory, and the non-pageable relocatable segment list in its entirety.

In addition, a system image dump saver is provided to the computer system. The system image dump saver is used to build a system image dump file and a companion system image dump symbol definition file.

The system image dump file comprises the system image dumped at the time of the system crash, thereby saving the system image dump for debugging. The companion system image dump system definition file comprises all symbol definitions of the operating system defined at the time of the system crash, regardless whether the symbol definitions have been paged out or not at the time of the system crash, thereby aiding in the debugging of the system crash.

The system image dump symbol definition file comprises a combined symbol table and a combined string table. The system image dump saver builds the combined symbol table and the combined string table by extracting symbol definition entries and string entries from the root executable segment and each loaded relocatable segment, and merging them into the corresponding tables. The system image dump saver extracts the symbol definition entries and string entries from the root executable segment and the appropriate relocatable segments stored on magnetic disk. The system image dump saver determines which relocatable segments are loaded at the time of the system crash using the relocatable segment list dumped.

BRIEF DESCRIPTION OF THE DRAWINGS

The objects, features, and advantages of the present invention will be apparent from the following detailed description of the preferred embodiment of the invention with references to the drawings in which:

FIG. 4 illustrates the file formats of the root executable segment and the relocatable segments of the operating system illustrated in FIG. 3.

FIG. 5 illustrates the symbol table and the string table in the program segments illustrated in FIG. 4.

NOTATIONS AND NOMENCLATURE

Figure 1:
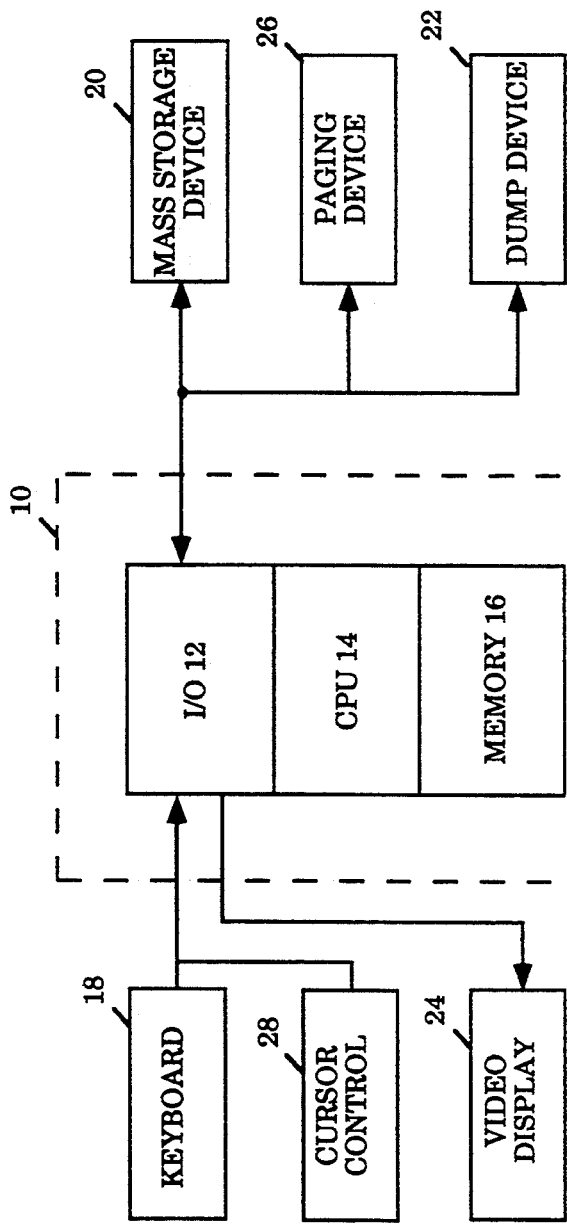
FIG. 1 shows a physical view of the hardware elements of a computer system that incorporates the teachings of the present invention.

The detailed description which follows is presented largely in terms of program procedures executed on a computer. These procedural descriptions and representations are the means used by those skilled in the art to most effectively convey the substance of their work to others skilled in the art.

A procedure is here, and generally, conceived to be a self-consistent sequence of steps leading to a desired result. These steps are those that require physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, objects, characters, terms, numbers, or the like. It should be borne in mind, however, that all these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operation described herein which form part of the present invention; the operations are machine operations. Useful machines for performing the operations of the present invention include general purpose digital computers or other similar devices. In all cases, it should be borne in mind the distinction between the method operations in operating a computer and the method of computation itself. The present invention relates to method steps for operating a computer in processing electrical or other physical signals to generate other desired physical signals.

The present invention also relates to apparatus for performing these operations. This apparatus may be specially constructed for the required purposes or it may comprise a general purpose computer as selectively activated or re-configured by a computer program stored in the computer. The procedures presented herein are not entirely related to any particular computer or other apparatus. In particular, various general purpose machines may be used with procedures written in accordance with the teaching herein, or it may prove more convenient to construct more specialized apparatus to perform the required method steps. The required structure for a variety of these machines will appear from the description given below.

DETAILED DESCRIPTION OF THE PREFERRED EMBODIMENT

A method and apparatus for reconstructing the symbol definitions of a dynamically configured operating system defined at the time of a system crash is disclosed. The method and apparatus has particular applications to dynamically configurable operating systems, including the kernel of the UNIX ® system. In the following description for purposes of explanation, specific numbers, materials and configurations are set forth in order to provide a thorough understanding of the present invention. However, it will be apparent to one skilled in the art that the present invention may be practiced without the specific details. In other instances, well known systems are shown in diagrammatical or block diagram form in order not to obscure the present invention unnecessarily.

Referring now to FIG. 1, a computer system that incorporates the teachings of the present invention is illustrated. Shown is a computer 10 which comprises three major components 12, 14, and 16. The first of these is an input/output (I/O) circuit 12 which is used to communicate information in appropriately structured form to and from other portions of the computer 10. In addition, the computer 10 includes a central processing unit (CPU) 14 coupled to the I/O circuit 12, and a memory 16. The I/O circuit 12, the CPU 14 and the memory 16 are those typically found in most general purpose computers.

A magnetic disk 20 is shown coupled to the I/O circuit 12 to provide additional storage capability for the computer 10. It will be appreciated that additional devices may be coupled to the computer 10 for storing data such as magnetic tape drives, as well as networks which are in turn coupled to other computer systems. As is well known, the disk 20 may store other computer programs, characters, routines, etc., which may be accessed and executed by the CPU 14.

A raster display monitor 24 is shown coupled to the I/O circuit 12 and is used to display images generated by the CPU 14 in accordance with the teachings of the present invention. Any well known variety of raster displays may be utilized as display 24. A keyboard 18 is shown coupled to the I/O circuit 12 and is used to input data and commands into the computer 10, as is well known. A cursor control device 28 is also shown coupled to the computer 10 through the I/O circuit 12. Any well known variety of cursor control devices may be utilized as cursor control device 28.

In fact, the several hardware elements illustrated are intended to represent a broad category of computer systems. Particular examples include computer systems manufactured by Sun Microsystems, Inc. of Mountain View, Calif. Other computer systems having like capabilities may of course be adapted in a straight forward manner to perform the functions described below.

Figure 2:
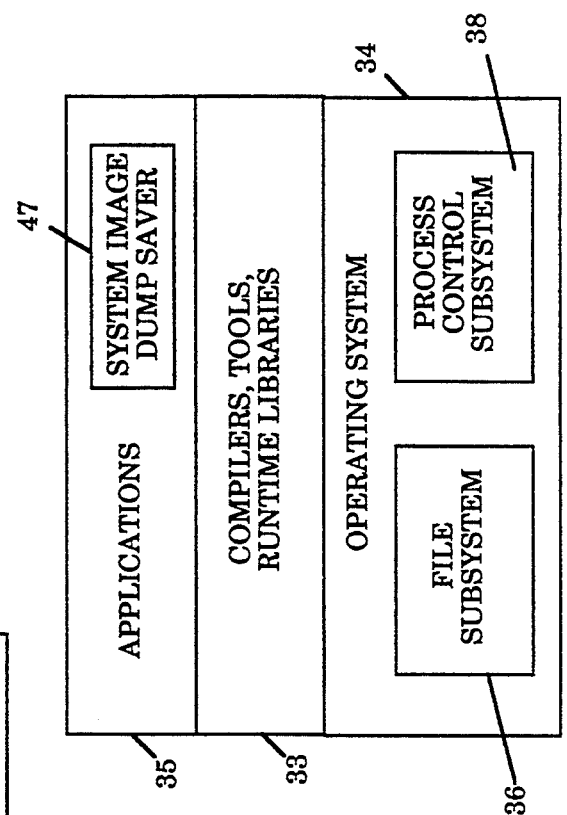
FIG. 2 shows a logical view of the software elements of the computer system illustrated in FIG. 1.

Referring now to FIG. 2, a block diagram illustrating a logical view of the software elements of the computer system illustrated in FIG. 1 is shown. Shown is an operating system 34 comprising a file subsystem 36 and a process control subsystem 38. The file subsystem 36 is responsible for managing files, allocating file spaces, administering free space, controlling access to files and retrieving data from files. The process control subsystem 38 is responsible for process synchronization, interprocess communication, memory management and process scheduling.

In its presently preferred form, the operating system is dynamically configured. The dynamically configured operating system is intended to represent a broad category of dynamically configured operating systems. The functions and the program segment structure of the operating system will be described in further detail below with references to FIGS. 3 and 4.

Also shown are programming language compilers, software tools/utilities and their runtime libraries 33 for application development and execution. The applications 35 executing on the computer system utilize the underlying system services offered by runtime libraries 33 and the operating system 34. In particular, the applications 35 comprise a system image dump saver 47. Except for the system image dump saver 47, these software elements are those typically found in most general purpose computer systems and almost all special purpose computer systems. The system image dump saver 47 will be described in further detail below with references to FIGS. 7-9.

Figure 3:
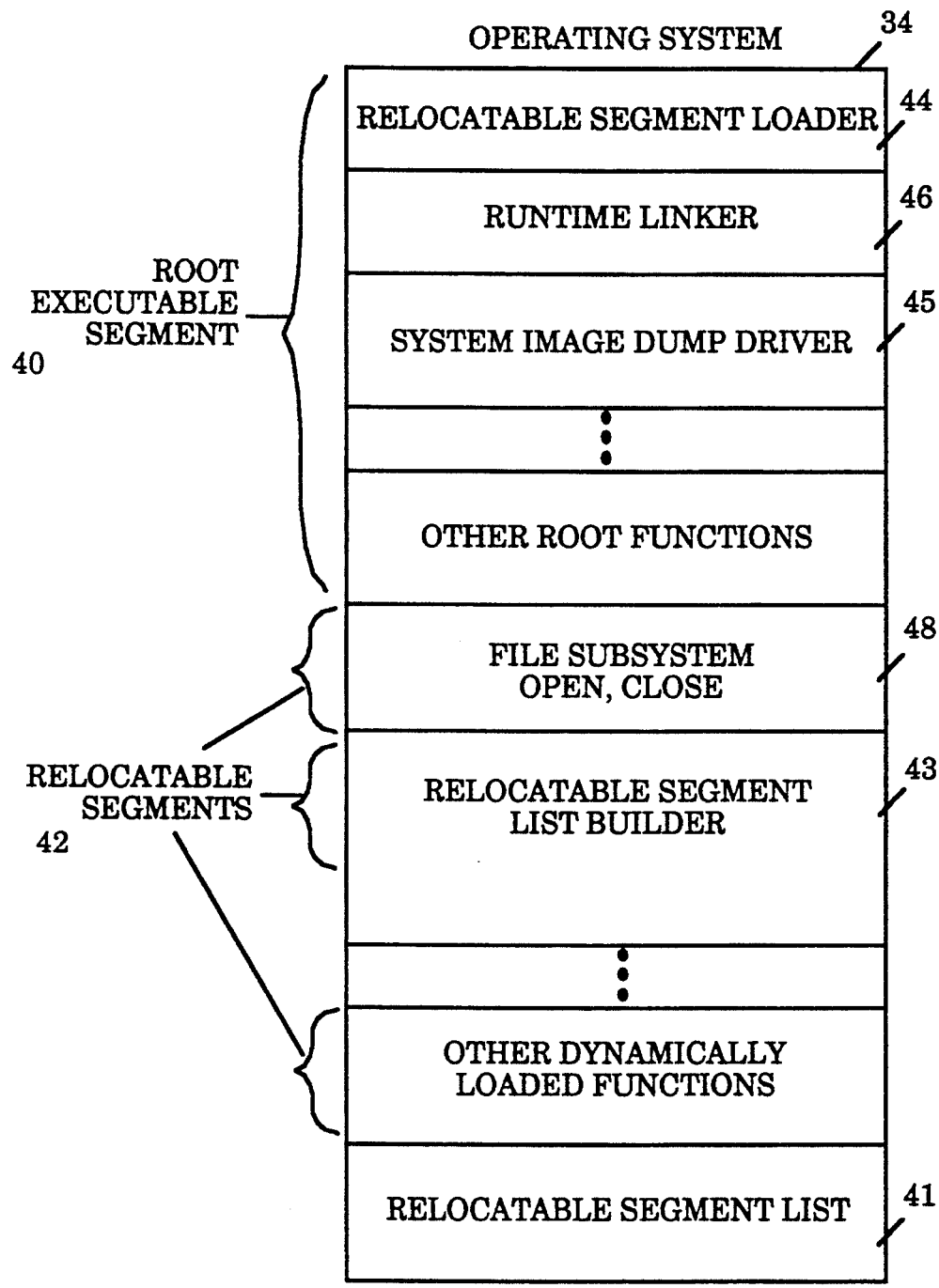
FIG. 3 illustrates a logical view of the functions and the program structure of the operating system illustrated in FIG. 2.

Referring now to FIG. 3, a block diagram illustrating a logical view of the functions and the program segment structure of the operating system illustrated in FIG. 2 is shown. The functions of the dynamically configurable operating system 34 are distributed in a root executable segment 40, and a number of dynamically loaded from a system library and linked relocatable segments 42. The root executable segment 40 is loaded from a system library and given control during system start up. The other relocatable segments 42 are dynamically loaded from the system library and linked when their functions are needed. The names of the relocatable segments that are currently loaded and linked are maintained in the relocatable segment list 41.

The functions offered by the root executable segment 40 comprise a relocatable segment loader 44, a runtime linker 46, and a system image dump driver 45. The relocatable segment loader 44 is used for dynamically loading the relocatable segments when their functions are needed. The runtime linker 46 is used for dynamically linking a dynamically loaded relocatable segment into the current process image of the operating system. The system image dump driver 45 is used for dumping the system image in memory to a dump device at the time of a system crash. The functions offered by the relocatable segments comprise a file subsystem 48, and a relocatable segment list builder 43. The file subsystem 48 provides file opening and closing system services. The file opening system service includes access control. The relocatable segment list builder 43 is used to maintain the relocatable segment list 41.

The functions and basic constitutions of the relocatable segment loader 44, the runtime linker 46, the system image dump driver 45, and the file subsystem 48 are well known and will not be described further. The relocatable segment list builder 43, and the relocatable segment list 41 will be discussed in further detail later with references to FIG. 6.

It will be appreciated that the present invention may be practiced with dynamically configurable operating systems having different but essentially equivalent functional distributions for the root executable and relocatable segments.

Referring now to FIG. 4, a block diagram illustrating the file formats for the root executable segment and the relocatable segments in their presently preferred form is shown. Shown is the root executable segment 40 comprising a file header 50, a program header table 52, and a number of statically linked segments, e.g. 54. The file header 50 describes the file's organization. The program header table 52 describes how to create the process image. Each statically linked segment, e.g. 54, comprises one or more sections which are similar to the sections in a relocatable segment described below. Individual portions of the root executable segment 40 may or may not be pageable.

Also shown is a relocatable segment 42 comprising a file header 58, an instruction section 60, a data section 62, a symbol table section 64, a string table section 66, and a section header table 68. Similarly, the file header 58 describes the file's organization. The instruction and data sections 60 and 62 comprise the program segment's instructions and data respectively. The symbol and string table sections 64 and 66 describe the symbol definitions of the program segment. The section header table 68 provides entries pointing to the various sections. Similarly, individual portions of a relocatable segment 42 also may or may not be pageable.

For further descriptions of the various elements of the root executable segment and the relocatable segments, see *UNIX ® System V Release 4 Programmer's Guide: ANSI C and Programming Supporting Tools*, UNIX Press, 1990, pp. 13-1 through 13-69.

Similarly, it will be appreciated that the present invention may be practiced with the root executable and relocatable segments having different but essentially equivalent file formats.

Referring now to FIG. 5, a block diagram illustrating a symbol table, and a string table in their presently preferred embodiment is shown. Shown is a symbol table 64 comprising a number of symbol definitions entries 70. Each symbol definition entry 70 comprises a name index field 72, a value field 73, a size field 74, a type field 76, a binding attribute field 78, and a section index field 80. The name index field 72 contains a name index pointing to an offset into the string table where the first character of the symbol name is located. The value field 73 contains the value representing the address of the memory object the symbol refers to. The size field 74 contains a value describing the symbol size. The type field 76 contains an indicator identifying the symbol type. The binding attribute filed 78 contains a number of symbol binding attributes. The section index field 80 contains a value pointing to a section header table entry in the section header table identifying the section the symbol is affiliated with.

Also shown is a string table 66 comprising a number of data bytes, e.g. 82. Each data byte, e.g. 84, contains a character including the null character delimiting the strings, e.g. 84. The data bytes are accessed as offsets into the string table 66 as illustrated. For example, the first character of the symbol "CAT." is located in the data byte with an offset Of "6" into the string table 66.

For further descriptions of the string table and the symbol table, also see *UNIX ® System V Release 4 Programmer's Guide: ANSI C and Programming Supporting Tools*, UNIX Press, 1990, pp. 13-1 through 13-69.

Likewise, it will be appreciated that the present invention may be practiced with the root executable and relocatable segments having different but essentially equivalent symbol and string tables.

Figure 6:
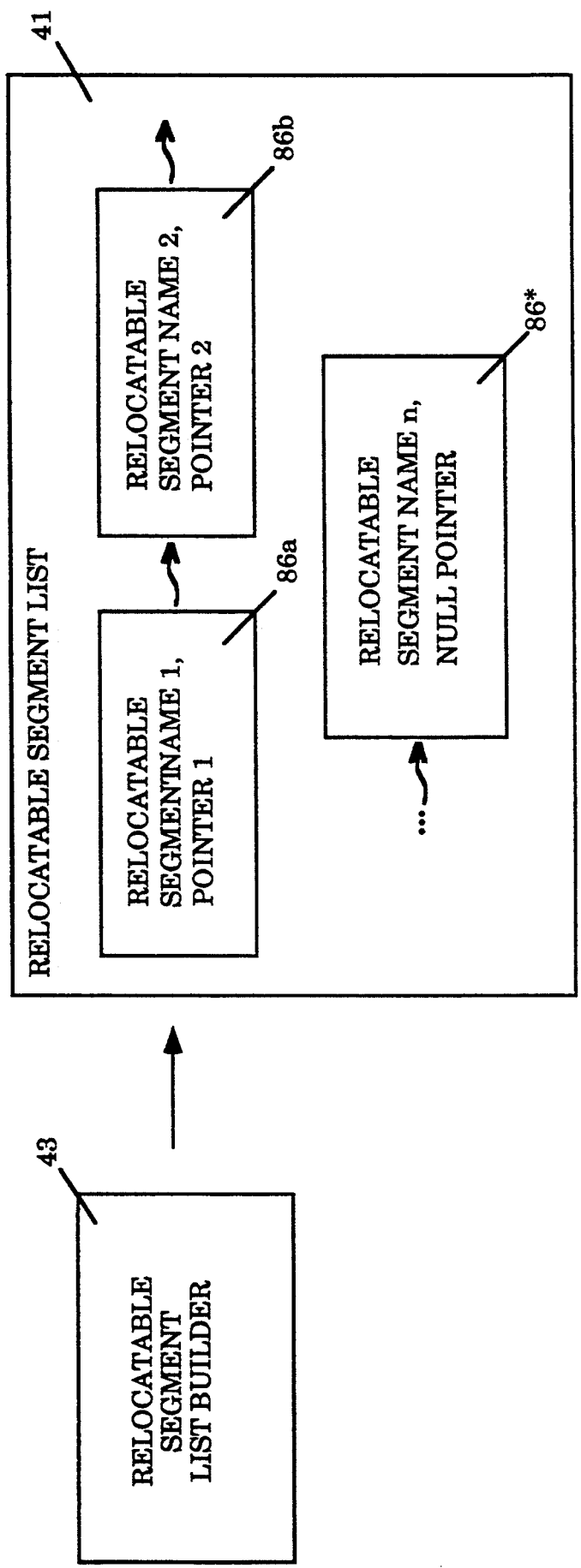
FIG. 6 illustrates the relocatable segment list builder and the relocatable segment list of the operating system illustrated in FIG. 3.

Referring now to FIG. 6, a block diagram illustrating the relocatable segment list builder and the relocatable segment list in their presently preferred form is shown.

The relocatable segment list 41 built by the relocatable segment list builder 43 comprises a plurality of relocatable segment name and pointer pairs 86a–86*. The pointers chain the relocatable segment names as a list. The entire relocatable segment list 41 is non-pageable. The relocatable segment list builder 43 may be implemented in any well known manner. It will be appreciated that the relocatable segments that are currently loaded and linked may be tracked by different but essentially equivalent data structures.

Figure 7:
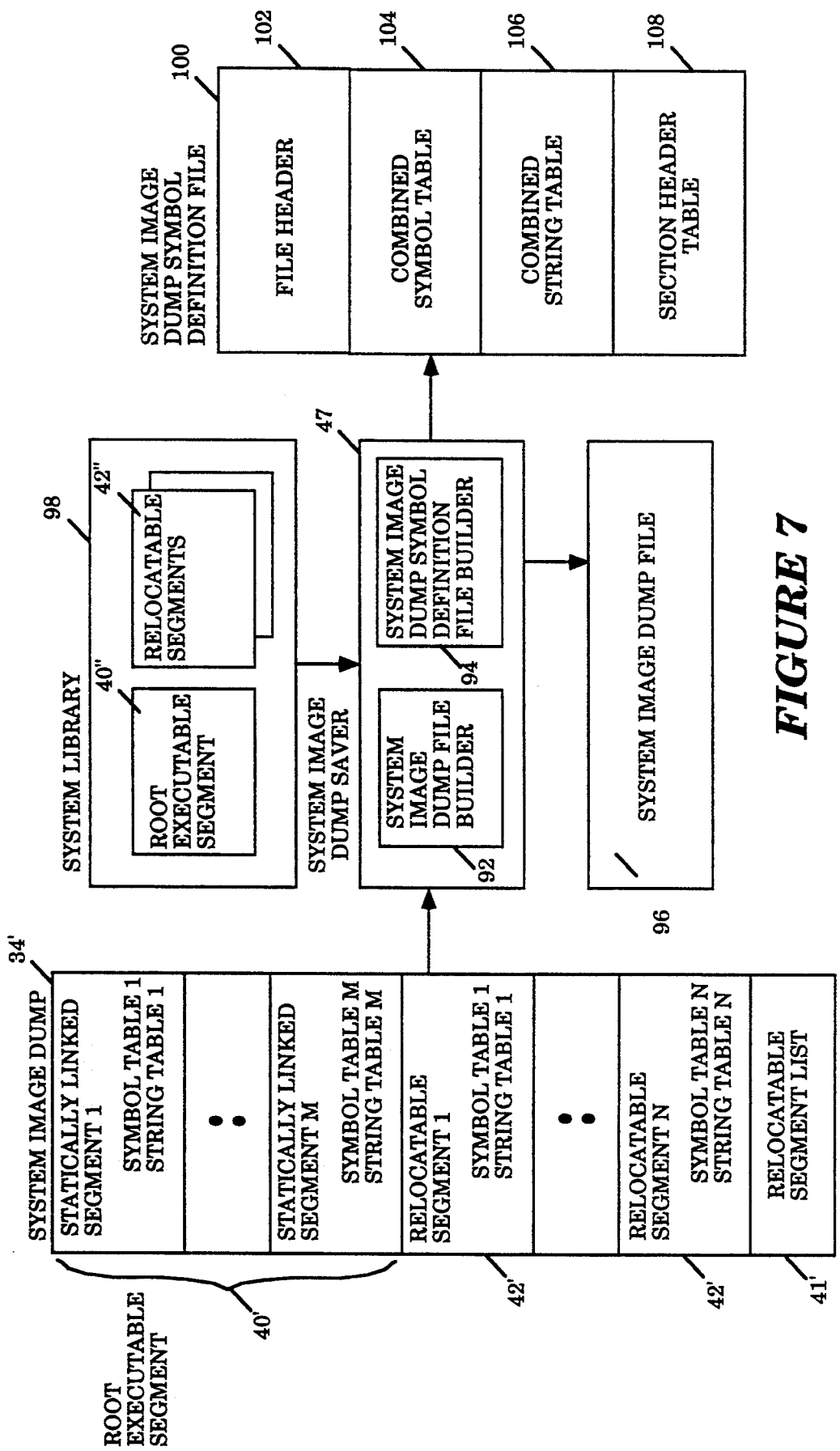
FIG. 7 illustrates the system image dump saver, the system image dump, the system image dump file and the system image dump symbol definition file of the present invention in their presently preferred form.

Referring now to FIG. 7, a block diagram illustrating the system image dump, the system image dump saver, the system dump image file, and the system image dump symbol definition file in their presently preferred form is shown. Shown is the system image dump 34' comprising the root executable segment 40', the relocatable segments 42', and the relocatable segment list 41' dumped from physical memory onto the dump device by the system image dump driver (reference 45, FIG. 3) at the time of the system crash. Each of the root executable and relocatable segments dumped 40' and 42' comprises the portion of the segment that has not been paged out of memory at the time of the system crash. The relocatable segment list dumped 41' comprises the entire relocatable segment list, since it is non-pageable.

Also shown is the application program system image dump saver 47 comprising a system image dump file builder 92 and a system image dump symbol definition file builder 94. The system image dump file builder 92 is used for building a system image dump file 96 using the system image dumped 34' to a dump device during a system crash. The system image dump symbol definition file builder 94 is used for building a system image dump symbol definition file 100 using the relocatable segment name list dumped 41' and the root executable 40'' and the relocatable segments 42'' stored on a magnetic disk. Typically, the system image dump saver 47 is invoked as part of the rebooting process after the system crash. The operation flow of the system image dump file builder 92 may be implemented in any of the well known manners. The operating flow of the system image dump symbol definition file builder 94 will be described in further detail later.

Also shown are the system image dump file 96, and the system image dump symbol definition file 100. The format for the system image dump file 96 may be implemented in any of the well known manners. The system image dump symbol definition file 100 comprises a file header 102, a combined symbol table section 104, a combined string table section 106 and a section header 108. Similar to the file formats for the root executable segment and the relocatable segments of the operating system, the file header 102 describes the system image dump symbol definition file's organization. The combined symbol table 104 and the combined string table 106 comprise all symbol definitions and strings of the operating system for the relocatable segments loaded at the time of the system crash respectively. The combined symbol table 104 and the combined string table 106 have the same organization as the individual symbol and string tables described earlier. Likewise, the section header table 108 comprises similar section entries pointing to the combined symbol table 104 and the combined string table 106.

Figure 8:
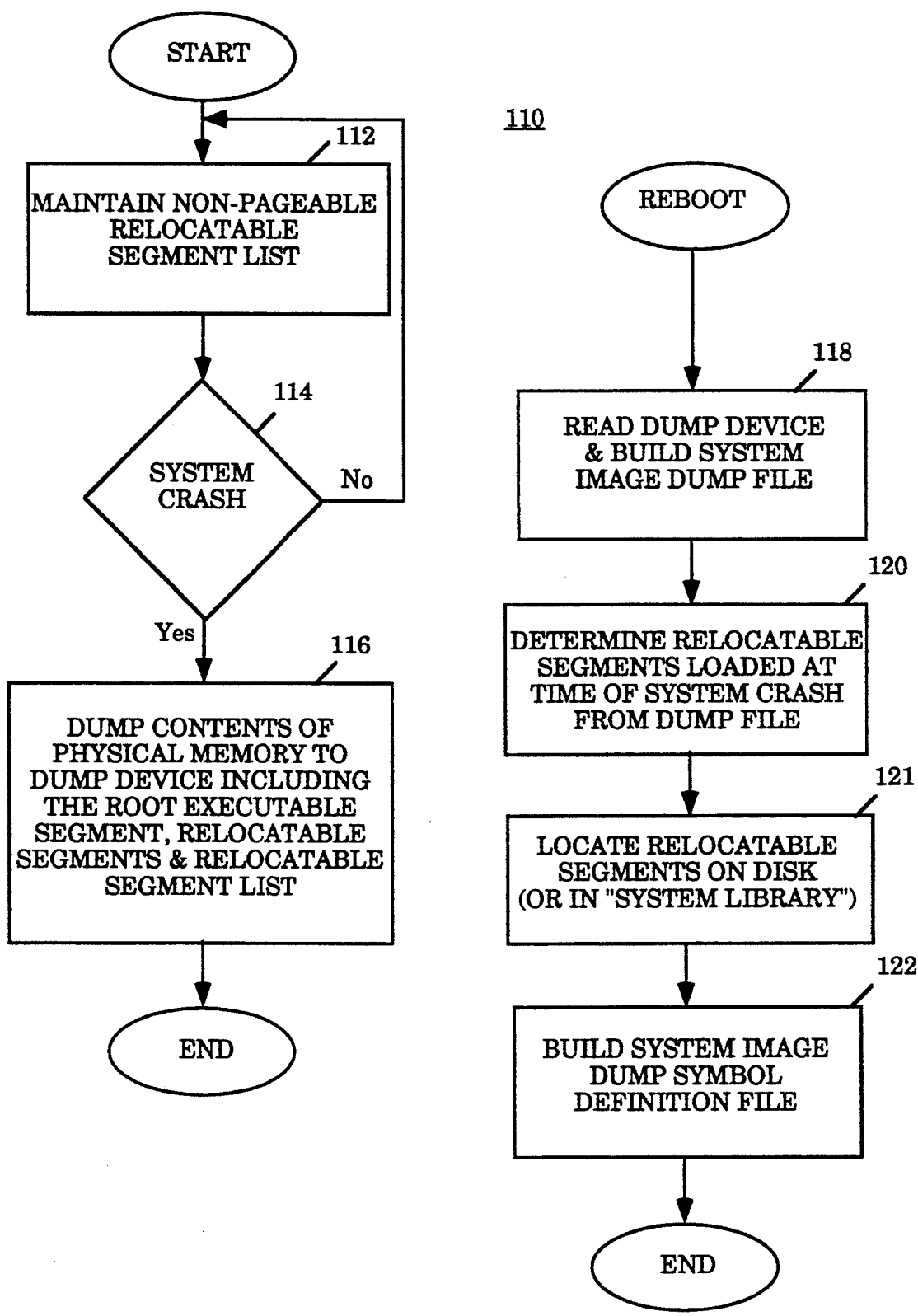
FIGS. 8 and 9 illustrates the operation flow of the method of the present invention in its presently preferred form.
Figure 9:
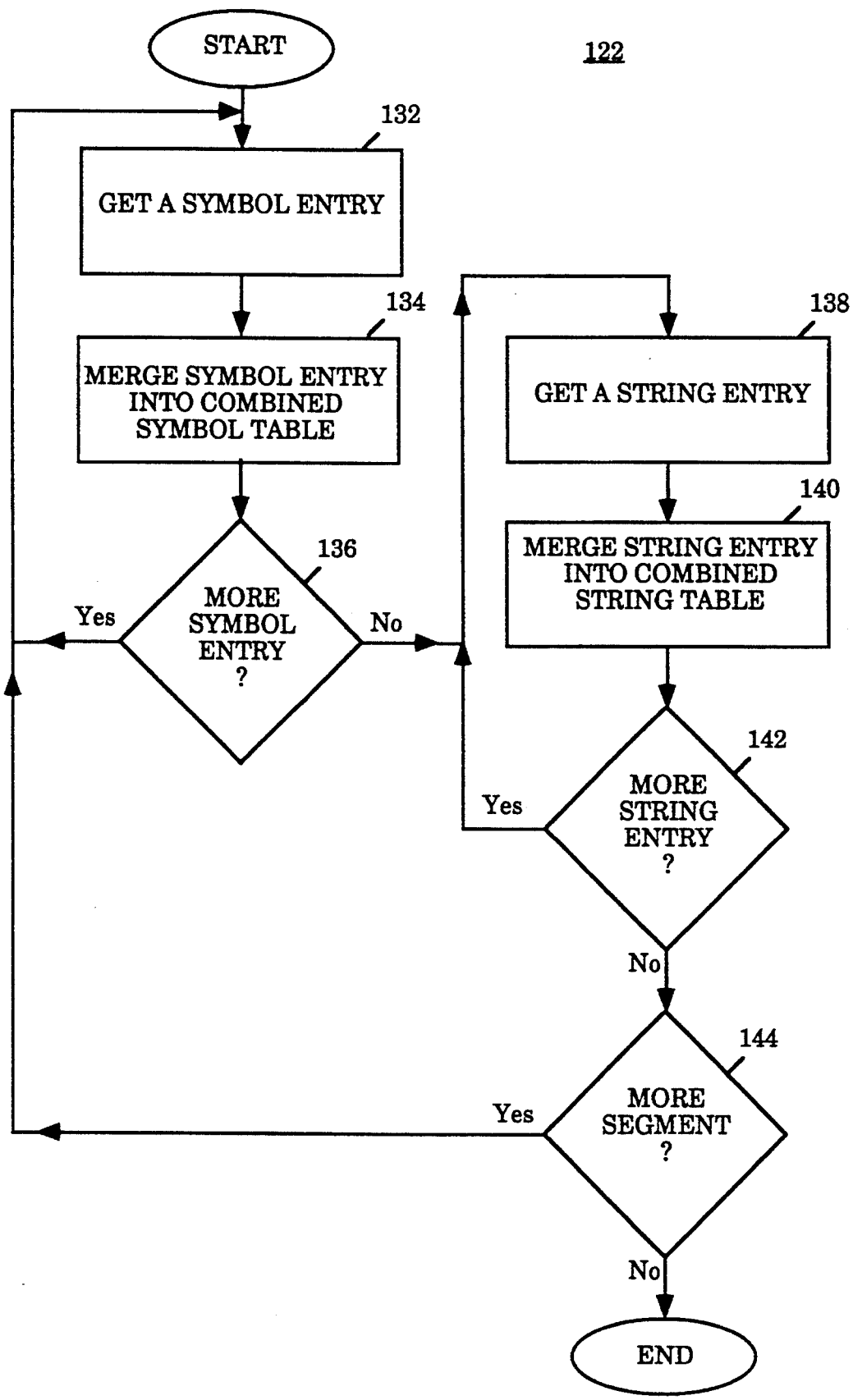

Referring now to FIGS. 8 and 9, two block diagrams illustrating the operation flow of the method of the present invention in its presently preferred form are shown. As shown in FIG. 8, the relocatable segment list builder maintains the non-pageable relocatable segment list tracking the relocatable segments that are loaded and linked at any particular point in time, block 112. When a system crash occurs, the system image dump driver dumps the contents of physical memory onto the dump device including the unpaged portions of the root executable and relocatable segments, and the non-pageable relocatable segment, block 116.

Then, at a later point in time, typically in the course of rebooting, the system image dump saver is invoked to read the dump device and build the system image dump file and the companion system image dump symbol definition file, blocks 118–122. As described earlier, the system image dump file builder builds the system image dump file using the system image dumped on the dump device, block 118. Then, the system image dump definition file builder determines the relocatable segments that are loaded and linked at the time of the system crash using the relocatable segment list included in the system image dump file, block 120. After determining the loaded relocatable segments, the system image dump symbol definition file builder locates the relocatable segments stored on disk (or in the system library), block 121, and builds the companion system image dump symbol definition file using the located relocatable segments, block 122.

It will be appreciated that blocks 118 and 122 may be performed on another compatible system at a subsequent point in time after the system crash by moving the system library and dump device to the compatible system, provided the dump device contents are moved before the system image dump is overlaid by the rebooted system.

As shown in FIG. 9, upon locating the relocatable segments stored on disk, the system image dump symbol definition file builder accesses the root executable program segment, retrieves all symbol entries from the symbol table of the root executable program segment and merges them into the combined symbol table one at a time until all symbol table entries have been retrieved and merged, blocks 132–136. Similarly, the system image dump symbol definition file builder then retrieves all string entries from the string table of the root executable program segment and merges them into the combined string table one at a time until all string table entries have been retrieved and merged, blocks 138–142. Blocks 132–142 are then repeated for each relocatable program segment that is loaded in memory at the time of the system crash as indicated by the relocatable segment list.

While the present invention has been described in terms of a presently preferred embodiment, those skilled in the art will recognize that the invention is not limited to the embodiment described. The method and apparatus of the present invention can be practiced with modification and alteration within the spirit and scope of the appended claims. The description is thus to be regarded as illustrative instead of restrictive on the present invention.

What is claimed is:

1. In a computer system comprising a central processing unit (CPU) executing a dynamically configurable operating system, wherein said operating system comprises symbol definitions that change dynamically, a method for reconstructing said symbol definitions at the time of a system crash that aids in debugging said system crash, said method comprising the steps of:

maintaining a non-pageable relocatable segment list in a memory, said list comprising names of relocatable segments of said operating system that are loaded into said memory and linked at any particular point in time, said operating system comprising a root executable segment that is loaded from a system library into said memory during system start up and a plurality of relocatable segments that are loaded from said system library into said memory and linked on an as needed basis, said system library containing a first copy of said operating system;

dumping an image of said operating system in said memory at the time of a system crash, said system image dump comprising images of unpaged sections of said root executable and relocatable segments, and said list, in said memory at the time of said system crash, said root executable and relocatable segments comprising individually pageable and non-pageable sections;

determining said relocatable segments that are loaded in said memory and linked at the time of said system crash using said relocatable segment list dumped; and building a system image dump symbol definition file comprising all symbol definitions of said operating system defined at the time of said system crash regardless whether said symbol definitions are paged out or not, said symbol definition file being built using said root executable and selected ones of said relocatable segments stored on mass storage, said selected ones of said relocatable segments being said relocatable segments that are determined to be loaded in said memory at the time of said system crash, said mass storage comprising a second copy of said operating system;

whereby allowing said system image symbol definition file to be used in aid of debugging said system crash.

2. The method as set forth in claim 1, wherein, said method further comprises the step of building a system image dump file using said image dumped.

3. The method as set forth in claim 1, wherein, said step of building a system image dump symbol definition file comprises the steps of:

extracting symbol table entries from a symbol table of said root executable segment in said system library;

merging said extracted symbol table entries into a combined symbol table;

extracting string table entries from a string table of said root executable segment in said system library; and merging said extracted string table entries into a combined string table.

4. The method as set forth in claim 3, wherein, said extracting and merging steps are repeated for each of said relocatable segments that is loaded in said memory at the time of said system crash.

5. The method as set forth in claim 3, wherein, each of said symbol table entries comprises a name index pointing to an offset into the corresponding string table where a symbol name is located, a symbol value representing an address of a memory object, a symbol size, a symbol type, at least one binding attribute, and a section index pointing to an offset into a section header table where a section name is located, said memory object being referred to by said symbol name, said section name being affiliated with said symbol name.

6. The method as set forth in claim 3, wherein, each of said string table entries comprises at least one null terminated character starting at an offset into said string table.

7. In a computer system comprising a central processing unit (CPU) executing a dynamically configurable operating system, wherein said operating system comprises symbol definitions that change dynamically, an apparatus for reconstructing said symbol definitions of said operating system defined at the time of a system crash to aid debugging said system crash, said apparatus comprising:

a non-pageable relocatable segment list comprising names of relocatable segments of said operating system that are loaded into said memory by said CPU and linked at any particular point in time, said operating system comprising a root executable segment that is loaded from a system library into said memory by said CPU during system start up and a plurality of relocatable segments that are loaded from said system library into said memory by said CPU and linked on an as needed basis, said system library being coupled to said CPU and said memory, said system library containing a first copy of said operating system;

maintenance means coupled to said CPU for maintaining said non-pageable relocatable segment list;

dumping means coupled to said CPU for dumping an image of said operating system in said memory at the time of a system crash onto a dump device, said system image dump comprising images of unpaged sections of said root executable and relocatable segments, and said list, in said memory at the time of said system crash, said root executable and relocatable segments comprising individually pageable and non-pageable sections, said dump device being coupled to said memory;

determining means coupled to said CPU for determining said relocatable segments that are loaded in said memory and linked at the time of said system crash using said relocatable segment list dumped, said dump device being coupled to said CPU; and first building means coupled to said CPU for building a system image dump symbol definition file on a storage device comprising all symbol definitions of said operating system defined at the time of said system crash regardless whether said symbol definitions are paged out or not, said symbol definition file being built using said root executable and selected ones of said relocatable segments stored in mass storage, said selected ones of said relocatable segments being said relocatable segments that are determined to be loaded in said memory at the time of said system crash, said storage device being coupled to said CPU, said mass storage comprising a second copy of said operating system;

whereby allowing said system image symbol definition file to be used in aid of debugging said system crash.

8. The apparatus as set forth in claim 7, wherein, said apparatus further comprises second building means coupled to said CPU for building a system image dump file on said storage device using said system image dumped.

9. The apparatus as set forth in claim 7, wherein, said first building means builds said system image dump symbol definition file by:

extracting symbol table entries from a symbol table of said root executable segment in said system library;

merging said symbol table entries into a combined symbol table on said storage device;

extracting string table entries from a string table of said root executable segment in said system library; and merging said string table entries into a combined string table on said storage device.

10. The apparatus as set forth in claim 9, wherein, said first building means repeats said extracting and merging for each of said relocatable segments that is loaded into said memory at the time of said system crash.

11. The apparatus as set forth in claim 9, wherein, each of said symbol table entries comprises a name index pointing to an offset into the corresponding string table where a symbol name is located, a symbol value representing an address of a memory object, a symbol size, a symbol type, at least one binding attribute, and a section index pointing to an offset into a section header table where a section name is located, said memory object being referred to by said symbol name, said section name being affiliated with said symbol name.

12. The apparatus as set forth in claim 9, wherein, each of said string table entries comprises at least one null terminated character starting at an offset into said string table.

13. A computer system comprising:

a central processing unit (CPU);

a memory coupled to said CPU for storing a dynamically configurable operating system executed by said CPU, said operating system comprises a root executable segment that is loaded from a system library into said memory at the time of system start up, a plurality of relocatable segments that are loaded from said system library into said memory on an as needed basis, and a relocatable segment list maintained in said memory comprising names of said relocatable segments that are loaded at any particular point in time, said root executable and relocatable segments comprising individually pageable and non-pageable sections, said relocatable segment list being non-pageable;

a paging device coupled to said memory for storing said paged sections of said loaded root executable and relocatable segments in said memory;

a dump device coupled to said memory and CPU for storing a dumped image of said operating system in said memory at the time of a system crash, said system image dumped comprising images of said unpaged sections of said root executable and relocatable segments and said relocatable segment list in said memory at the time of said system crash;

a first storage device for storing said system library comprising said root executable and relocatable segments of said operating system;

a second storage device for storing a system image dump symbol definition file comprising all symbol definitions of said operating system defined at the time of said system crash, said symbol definition file being built using said root executable segment and selected ones of said relocatable segments in said system library, said selected ones of said relocatable segments being said relocatable segments determined to be loaded at the time of said system crash, said relocatable segments being determined to be loaded at the time of said system crash using said relocatable segment list dumped.

14. The computer system as set forth in claim 13, wherein said second storage device is further used for storing a system image dump file, said system image dump file being built using said system image dumped.

15. The method as set forth in claim 1, wherein, said first copy and said second copy of said operating system are the same copy of said operating system, said mass storage storing said system library.

16. The apparatus as set forth in claim 7, wherein, said first copy and said second copy of said operating system are the same copy of said operating system, said mass storage storing said system library.

* * * * *